United States Patent
Barnes et al.

(10) Patent No.: US 6,502,513 B1
(45) Date of Patent: Jan. 7, 2003

(54) TABLET FORM OF GAS GENERANT

(75) Inventors: Michael W. Barnes, Brigham City, UT (US); Gary L. Smith, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 65 days.

(21) Appl. No.: 09/716,831

(22) Filed: Nov. 17, 2000

(51) Int. Cl.$^7$ ............................................... C06D 5/06
(52) U.S. Cl. ..................... 102/289; 102/288; 102/290; 102/286
(58) Field of Search .................. 102/286, 288, 102/289, 290

(56) References Cited

U.S. PATENT DOCUMENTS

| | | | |
|---|---|---|---|
| 3,014,427 A | * 12/1961 | Scurlock | 102/288 |
| 3,494,286 A | * 2/1970 | Taylor | 102/288 |
| 3,756,025 A | * 9/1973 | McCullough | 102/289 X |
| 4,204,473 A | * 5/1980 | Dardick | 102/39 |
| 4,386,569 A | 6/1983 | Deas | |
| 4,846,368 A | * 7/1989 | Goetz | 102/288 X |
| 4,911,077 A | * 3/1990 | Johansson et al. | 102/289 |
| 5,019,220 A | 5/1991 | Taylor et al. | 264/3.4 |
| 5,101,730 A | * 4/1992 | Bender et al. | 102/289 X |
| 5,160,386 A | 11/1992 | Lund et al. | 149/88 |
| 5,345,873 A | 9/1994 | Lauritzen et al. | 102/290 |
| 5,551,343 A | 9/1996 | Hock et al. | 102/288 |
| 5,578,787 A | * 11/1996 | Kobari et al. | 102/289 X |
| 5,593,181 A | 1/1997 | Walker et al. | 280/741 |
| 5,608,183 A | 3/1997 | Barnes et al. | 149/45 |
| 5,892,172 A | * 4/1999 | Candland et al. | 102/288 |
| 6,053,110 A | 4/2000 | Marchant et al. | 102/288 |
| 6,129,023 A | * 10/2000 | Marsaud et al. | 102/289 |

FOREIGN PATENT DOCUMENTS

| | | |
|---|---|---|
| EP | 0 867 347 A3 | 11/1999 |
| EP | 0 867 347 A2 | 11/1999 |
| JP | 2001278690 | 10/2001 |

* cited by examiner

Primary Examiner—Peter A. Nelson
(74) Attorney, Agent, or Firm—Sally J. Brown; James D. Erickson

(57) ABSTRACT

A gas generant material body in the form of a tablet having a triangular cross section and associated methods of gas generation are provided.

34 Claims, 5 Drawing Sheets

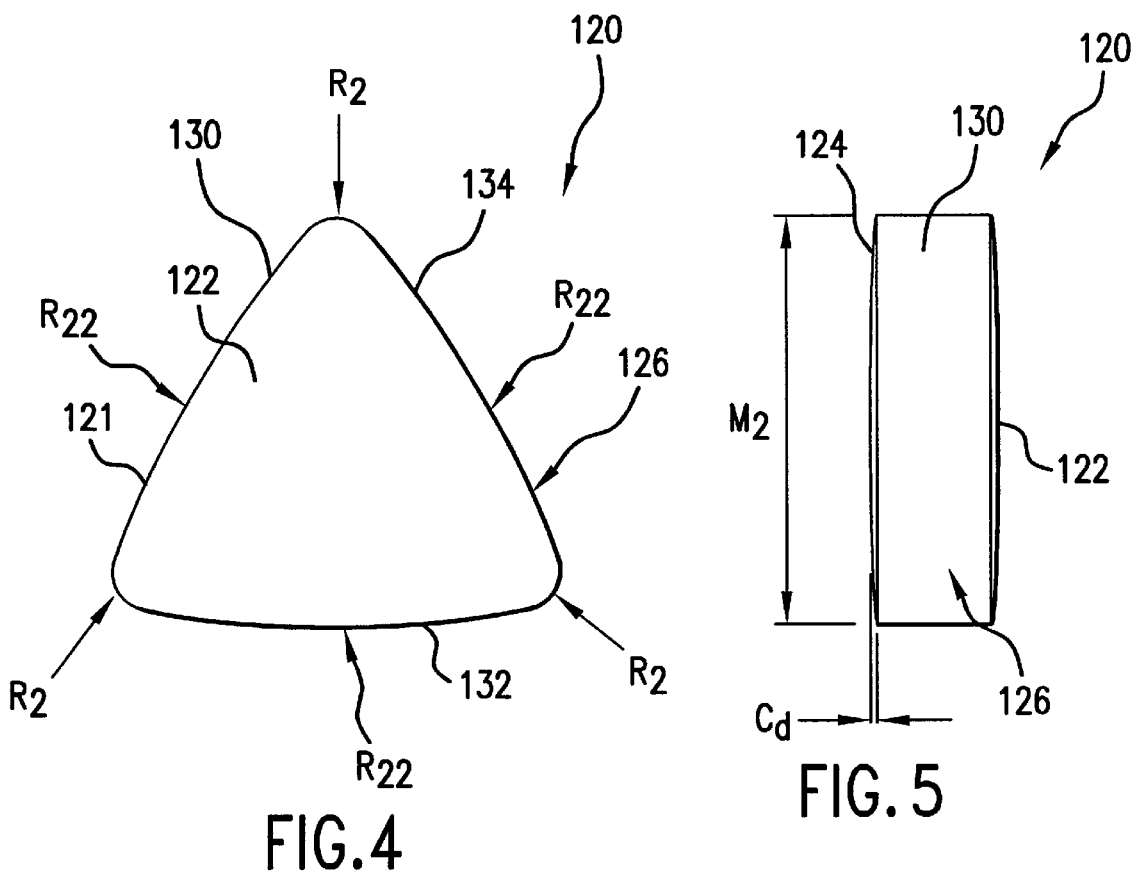
FIG. 4
FIG. 5
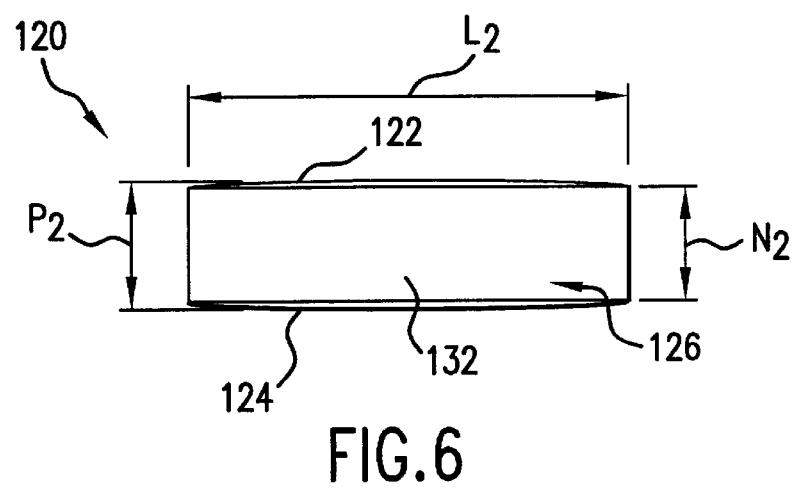
FIG. 6

TABLET FORM OF GAS GENERANT

BACKGROUND OF THE INVENTION

This invention relates generally to gas generant materials such as used to inflate automotive inflatable restraint airbag cushions and, more particularly, to gas generant materials having specific geometric forms or shapes.

Gas generating materials are useful in a variety of different contexts. One significant use for such compositions is in the operation of automotive inflatable restraint airbag cushions. It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Such systems typically also include one or more crash sensors mounted on or to the frame or body of the vehicle to detect sudden decelerations of the vehicle and to electronically trigger activation of the system. Upon actuation of the system, the cushion begins to be inflated in a matter of no more than a few milliseconds with gas produced or supplied by a device commonly referred to as an "inflator." In practice, such an airbag cushion is desirably deployed into a location within the vehicle between the occupant and certain parts of the vehicle interior, such as a door, steering wheel, instrument panel or the like, to prevent or avoid the occupant from forcibly striking such part(s) of the vehicle interior.

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

Gas generant materials having various forms have been developed or proposed for use in such safety system applications. For example, inflators which contain gas generant in the form of cylindrical pressed pellets or tablets having a generally circular or rounded cross section and which cylindrical tablets can be randomly packed into a combustion chamber of the inflator device are well known in the art. Alternatively, the art has also described the use of perforated or annular-shaped cylinders of pyrotechnic compositions, see EP 867 347, for example.

In practice, an inflator device is typically selected for a particular installation based at least in part on the performance capabilities required of the inflator in such installation. "Rise rate", i.e., the rate at which the gas output from an inflator increases pressure, as measured when such gas output is directed into a closed volume, is a common performance parameter used in the design, selection and evaluation of inflator devices for particular restraint system installations.

Relatively aggressive requirements for inflator performance have been established by some automobile companies for at least certain applications. For example, assuming that an occupant is properly seated and wearing an appropriate seat belt, such automobile companies may seek for the onset of airbag cushion deployment to occur at relatively higher minimum speeds such that less time may be required for the airbag cushion to properly deploy. For instance, relatively aggressive requirements for an inflator for an airbag cushion to provide front impact protection to a driver (i.e., a driver inflator) may include the following (as measured in a 60-liter tank): maximum pressure ($P_{max}$) as 230 kPa; pressure at 20 ms following initiation ($P_{20}$) as 145 kPa; and rise rate, here specifically defined in terms of the maximum rise in pressure over a 5-ms time period, as 56 kPa. In contrast, the requirements for a typical "depowered" inflator for current systems are: $P_{max}$ of 160 kPa to 180 kPa; $P_{20}$ of 84 kPa; and a maximum rise rate over a 5-ms time period of 40 kPa.

In general, the rise rate of a pyrotechnic-based inflator device as described above is primarily a factor of the burn rate and the surface area of the pyrotechnic gas generant material. Pyrotechnic gas generant materials having different burn rate characteristics have been developed. For example, U.S. Pat. No. 5,608,183, whose disclosure is hereby incorporated by reference herein and made a part hereof, discloses one such family of gas generant material. Such gas generant materials have various desirable properties or characteristics including: high gas yield, excellent aging and produce or result in desirably low levels of trace gas products such as nitric oxide and carbon monoxide. Considerable experimentation with this particular family of pyrotechnics has shown that these pyrotechnic materials generally have a burn rate range of 0.5 ips to 0.6 ips at 1000 psi and that there is scant likelihood that the burn rate can be significantly increased beyond this range.

Efforts to increase the surface area of such and similar gas generant materials are generally subject to several limitations. For example, standard cylindrical gas generant material tablets have a diameter of 0.25 inches. The thickness of such tablets can be no less than about 0.055 inches because of safety issues for manufacturing. In particular, the pressing of tablets of such materials in a thickness of significantly less than 0.055 inches may result in unacceptable risks of inadvertent ignition or reaction during the manufacturing or production process.

Alternatively, the surface area of gas generant material can be increased by increasing the load of tablets having such dimensions. The use of an increased load of such dimensioned tablets, however, is generally limited as most inflators are volume constrained and there is no "extra" volume to contain the increased load of gas generant material. Further, increasing the gas generant material load in an inflator may require that the inflator be specially constructed (e.g., have thicker walls) in order to properly ensure that the maximum combustion pressure that the inflator can tolerate will not be exceeded.

Thus, there is a need and a demand for a tablet form of gas generant which will yield a higher surface area at a constant gas generant load while satisfying minimum tablet thickness requirements such as necessitated by manufacturing safety issues.

SUMMARY OF THE INVENTION

A general object of the invention is to provide an improved form of gas generant.

A more specific objective of the invention is to overcome one or more of the problems described above.

The general object of the invention can be attained, at least in part and in accordance with one preferred embodiment of the invention, through a body of gas generant material in the form of a tablet having a triangular cross section and with a top face, a bottom face and a side face extending between the top and bottom surface.

The prior art generally fails to provide a tablet form of gas generant which will yield a higher surface area at a constant gas generant load while satisfying minimum tablet thickness requirements such as necessitated by manufacturing safety issues. In particular, the prior art generally fails to provide a tablet form of gas generant material such will more readily permit the use of low to moderate burn rate gas generant materials in applications having relatively high minimum rise rate requirements.

The invention further comprehends, in accordance with another embodiment of the invention, a body of gas generant material having a burn rate of no more than about 0.6 ips at 1000 psi and of a form having a cup-shaped top face, a cup-shaped bottom face and a side face extending between the top and bottom surface. The side face is composed of three arced side face segments. Each one of the three side face segments is joined with each of the other two of the three side face segments via a rounded corner.

The invention still further comprehends a method of generating gas. In accordance with one preferred embodiment of the invention such method involves igniting a plurality of specially shaped gas generant material bodies disposed within a combustion chamber. In particular, the specially shaped gas generant material bodies are in the form of a tablet having a triangular cross section and with a top face, a bottom face and a side face extending between the top and bottom surface.

Other objects and advantages will be apparent to those skilled in the art from the following detailed description taken in conjunction with the appended claims and drawings.

BRIEF DESCRIPTION OF THE DRAWINGS

FIGS. 4–6 are front, side and end views, respectively, of a body of gas generant material in a form in accordance with another embodiment of the invention.

DETAILED DESCRIPTION OF THE INVENTION

The present invention provides a body of gas generant material in the form of a tablet such as will yield a higher surface area at a constant gas generant load while satisfying minimum tablet thickness requirements such as necessitated by manufacturing safety issues. As described in greater detail below, a body of gas generant material in the form of a tablet having a triangular cross section has been found to yield a higher surface area at a constant gas generant load while satisfying other tableting requirements.

Figure 1:
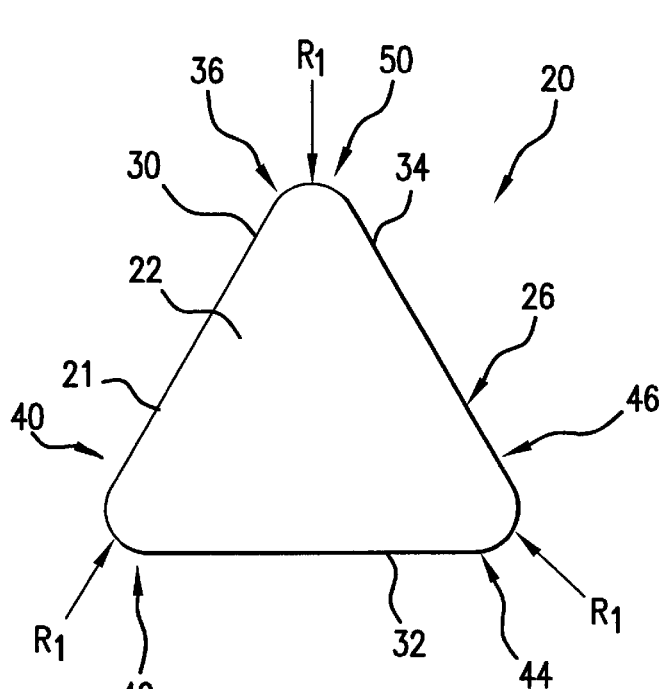
FIGS. 1–3 are front, side and end views, respectively, of a body of gas generant material in a form in accordance with one embodiment of the invention.
Figure 2:
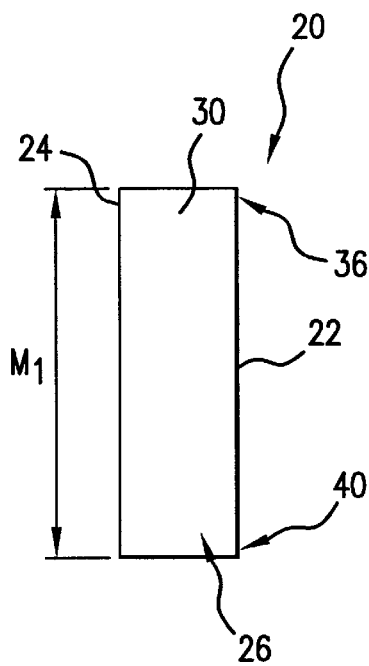
Figure 3:
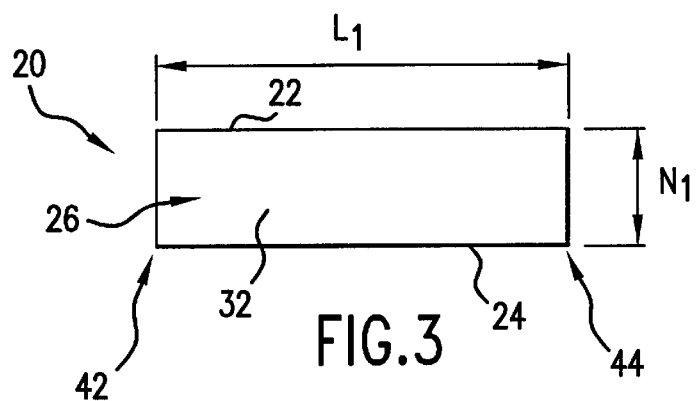

Turning first to FIGS. 1–3, there is illustrated a body of gas generant material, generally designated by the reference numeral 20, in a form in accordance with one embodiment of the invention. More particularly, the body of gas generant material 20 is in the form of a tablet having a generally triangular cross section 21. The body of gas generant material 20 includes a top face 22, a bottom face 24 and a side face 26 extending between the top face 22 and the bottom face 24.

The side face 26 is composed of first, second and third side face segments 30, 32 and 34, respectively. The side face segments 30, 32, and 34 transition into each other such as to form the triangular cross section body form 21 therebetween. In particular, each of the side face segments 30, 32 and 34, respectively, has opposed first and second ends, with the first side face segment 30 having a first end 36 and a second end 40, the second side face segment 32 having a first end 42 and a second end 44, and the third side face segment 34 having a first end 46 and a second end 50. The first side face segment second end 40 transitions into the second side face segment first end 42; the second side face segment second end 44 transitions into the third side face segment first end 46; and the third side face segment second end 50 transitions into the first side face segment first end 36.

As shown, such corner transitions between adjoining side face segments may desirably be curved or otherwise appropriately radiused, as signified by the letter "R." Those skilled in the art and guided by the teachings herein provided will appreciate that through such or similar curving, the presence or occurrence of sharp edges such as may result in undesirable breakage when such gas generant body forms are used en masse can desirably be at least reduced or minimized. Further, while the gas generant body 20 has been shown with such transitions between adjoining side face segments as each being of at least about the same radius, it will be appreciated that the broader practice of the invention is not necessarily so limited. For example, if desired the invention can be practiced employing a gas generant body wherein one or more of such corner transitions is of a radius different than the other corner transition radiuses.

In the particular gas generant body 20 shown in FIGS. 1–3, each of the side face segments 30, 32, and 34 are of equal length, such as to form a symmetrical cross sectional shape having the general form of an equilateral triangle. While such symmetrically shaped triangular cross section shape gas generant bodies are generally preferred as, for example, symmetric shapes can desirably facilitate or simplify either or manufacture and production, it is to be understood that the broader practice of the invention is not necessarily so limited. For example, gas generant bodies having an irregularly shaped triangular cross section can, if desired, be used.

Gas generant bodies, in accordance with a preferred embodiment of the invention, desirably are sized such as to be encompassed within a circumscribing circle having a radius of at least about 3/16 in to no more than about 5/16 in.

While those skilled in the art will appreciate that the broader practice of the invention is not necessarily limited to such gas generant bodies having specific dimensions, to facilitate and promote a more complete understanding of the invention values for the various dimensions (e.g., $L_1$, $M_1$, $N_1$ and $R_1$) identified in FIGS. 1–3 for a gas generant material 20 in accordance with one specific embodiment of the invention are identified in TABLE 1, below.

TABLE 1

| PARAMETER | DIMENSION (inches) |
| --- | --- |
| $L_1$ | 0.2057 |
| $M_1$ | 0.1835 |
| $N_1$ | 0.0550 |
| $R_1$ | 0.0200 |

While the invention has been described above with reference to a body of gas generant material 20 composed of top, bottom and side faces which are flat, i.e., have no radius, it will be appreciated that the broader practice of the invention is not necessarily so limited. For example, FIGS. 4–6 illustrate a body of gas generant material, generally designated by the reference numeral 120, in a form in accordance with an alternative embodiment of the invention.

The body of gas generant material 120, similar to the gas generant material body 20 described above, is in the form of a tablet having a triangular cross section 121 and includes a top face 122, a bottom face 124 and a side face 126 extending between the top face 122 and the bottom face 124. The side face 126 is composed of first, second and third side face segments 130, 132 and 134, respectively. The side face segments 130, 132, and 134 transition into each other, in a general manner similar to that shown for the gas generant material body 20 described above, such as to form the triangular cross section body form 121 therebetween. Further, as described above, such transition between adjoining side face segments may desirably be curved or otherwise appropriately radiused, as signified by the reference "$R_2$", such as to reduce or minimize the presence or occurrence of sharp edges such as may result in undesirable breakage when such gas generant body forms are used en masse.

As with the gas generant body 20, described above, the gas generant body 120 has been shown with such transitions between adjoining side face segments as each being of at least about the same radius. Again it is to be appreciated that the broader practice of the invention is not necessarily so limited as the invention can, if desired, be practiced employing a gas generant body wherein one or more of such corner transitions is of a radius different than the other corner transition radiuses.

The body of gas generant material 120, however, differs from the gas generant material body 20 described above in at least one significant respect. In particular and as described in greater detail below, each of the top face 122, the bottom face 124 and the first, second and third side face segments 130, 132 and 134, respectively, is curved. For example, each of the top face 122 and the bottom face 124 is cup-shaped with a cup depth ($C_d$), as shown. Further, each of the side face segments 130, 132 and 134 is bowed, with such bowed side face segments desirably having an arc radius ($R_{22}$).

The inclusion of such curved faces has been found desirable in gas generant material forms in accordance with a preferred embodiment of the invention as the presence or inclusion of such curved surfaces is generally helpful in avoiding undesired stacking of the gas generant bodies when a plurality of such bodies are present en masse. In particular, the occurrence of stacking between adjacent gas generant bodies can undesirably serve to reduce the effective surface area of gas generant material exposed for reaction and can thus dramatically reduce the rise rate obtainable upon the initiation thereof.

Those skilled in the art and guided by the teachings herein provided will appreciate that while the inclusion of such curved surfaces is generally helpful in avoiding undesired stacking, the inclusion of such curved surfaces may reduce or limit the surface area benefits otherwise obtainable through the practice of the invention. Thus, in at least certain preferred embodiments of the invention, it is preferred that the extent or degree of such curving, though sufficient to avoid undesired stacking of the gas generant bodies, be otherwise reduced or minimized as much as possible while still being practical from a manufacturing or production point of view. For example, gas generant material bodies with cup-shaped top and bottom faces each desirably having a cup depth ($C_d$) of at least about 0.003 in to no more than about 0.007 in have, in accordance with one embodiment of the invention, been found preferred. Similarly, gas generant material bodies with bowed side face segments each desirably having an arc radius ($R_{22}$) of at least about 0.2 in to no more than about 0.8 in have, in accordance with one embodiment of the invention, been found preferred.

Further, while the gas generant body 120 has been shown with such cup-shaped top and bottom faces of the same or similar cup depth and the bowed side face segments of the same or similar arced radius, it will be appreciated that the broader practice of the invention is not necessarily so limited. In particular, if desired the invention can be practiced employing a gas generant body having top and bottom faces of different cup depth, including even specific embodiments wherein one of the top and bottom faces is flat, i.e., a cup depth of 0. Further, if desired the invention can be practiced employing a gas generant body having one or more of such side face segments of different arc radius, including even specific embodiments wherein one or more of such side face segments is flat.

While those skilled in the art will again appreciate that the broader practice of the invention is not necessarily limited to such gas generant bodies having specific dimensions, to facilitate and promote a more complete understanding of the invention values for the various dimensions (e.g., $L_2$, $M_2$, $N_2$, $R_2$, $c_d$ and $P_2$) identified in FIGS. 4–6 for a gas generant material 120 in accordance with one specific embodiment of the invention are identified in TABLE 2, below.

TABLE 2

| PARAMETER | DIMENSION (inches) |
| --- | --- |
| $L_2$ | 0.2056 |
| $M_2$ | 0.1890 |
| $N_2$ | 0.0540 |
| $R_2$ | 0.0200 |
| $C_d$ | 0.0030 |
| $P_2$ | 0.0600 |

Figure 7:
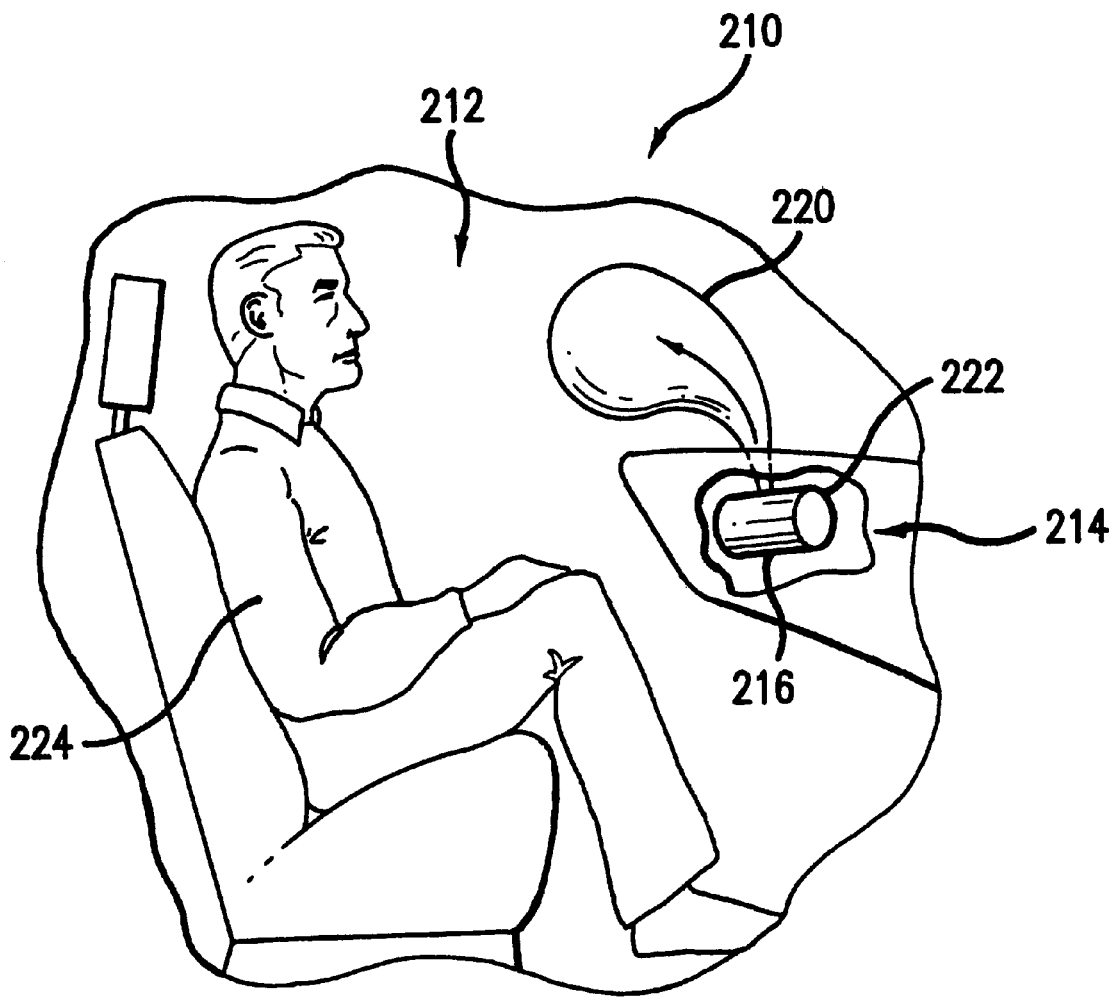
FIG. 7 is a simplified schematic, partially broken away, view illustrating the deployment of an airbag cushion from an airbag module assembly within a vehicle interior, in accordance with one embodiment of the invention.

As will be appreciated, gas generating compositions in accordance with the invention can be incorporated, utilized or practiced in conjunction with a variety of different structures, assemblies and systems. As representative, FIG. 7 illustrates a vehicle 210 having an interior 212 wherein is positioned an inflatable vehicle occupant safety restraint system, generally designated by the reference numeral 214. As will be appreciated, certain standard elements not necessary for an understanding of the invention may have been omitted or removed from FIG. 7 for purposes of facilitating illustration and comprehension.

The vehicle occupant safety restraint system 214 includes an open-mouthed reaction canister 216 which forms a housing for an inflatable vehicle occupant restraint 220, e.g., an inflatable airbag cushion, and an apparatus, generally designated by the reference numeral 222, for generating or supplying inflation gas for the inflation of an associated occupant restraint. As identified above, such a gas generating device is commonly referred to as an inflator.

The inflator 222 contains a quantity of a gas generant material in a body form in accordance with the invention and such as described above. The inflator 222 also includes an ignitor, such as known in the art, for initiating combustion of the gas generating composition in ignition communication with the gas generant composition. As will be appreciated, the specific construction of the inflator device does not form a limitation on the broader practice of the invention and such inflator devices can be variously constructed such as is also known in the art.

In practice, the airbag cushion 220 upon deployment desirably provides for the protection of a vehicle occupant 224 by restraining movement of the occupant in a direction toward the front of the vehicle, i.e., in the direction toward the right as viewed in FIG. 7.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1 and Comparative Examples (CE) 1–5

Tablets with faces in the shapes of regular polygons with the specified number of sides were evaluated and compared, as shown in TABLE 3, below, where tablet area, volume and mass refer to outer surface area, volume and mass of a respective tablet; "# TABLETS" refers to the total number of tablets required for the specified load; and "TOTAL SURFACE AREA" refers to the calculated outer surface area total provided for by the tablets at the specified load.

In comparing these tablet shapes, the following parameters were kept constant:

density=2.0 grams per cubic centimeter
radius of circumscribed circle=0.125 inches
thickness=0.055 inches
load=52 grams Comparative Example 6

A pyrotechnic gas generant material composition having a burn rate of 0.55 ips at 1000 psi was formed into a plurality of cylindrical tablets having the following dimensions:

diameter=0.25 in
thickness=0.055 in.

Then, a 30-gram load of these cylindrical pyrotechnic gas generant material tablets was loaded in a heavyweight test inflator device and the test inflator device was mated to a 60-liter steel test tank. The test tank was equipped with a pressure transducer. The tank pressure vs. time performance, realized upon the firing of the test inflator device, was recorded by means of the pressure transducer and an associated data collection system.

Figure 8:
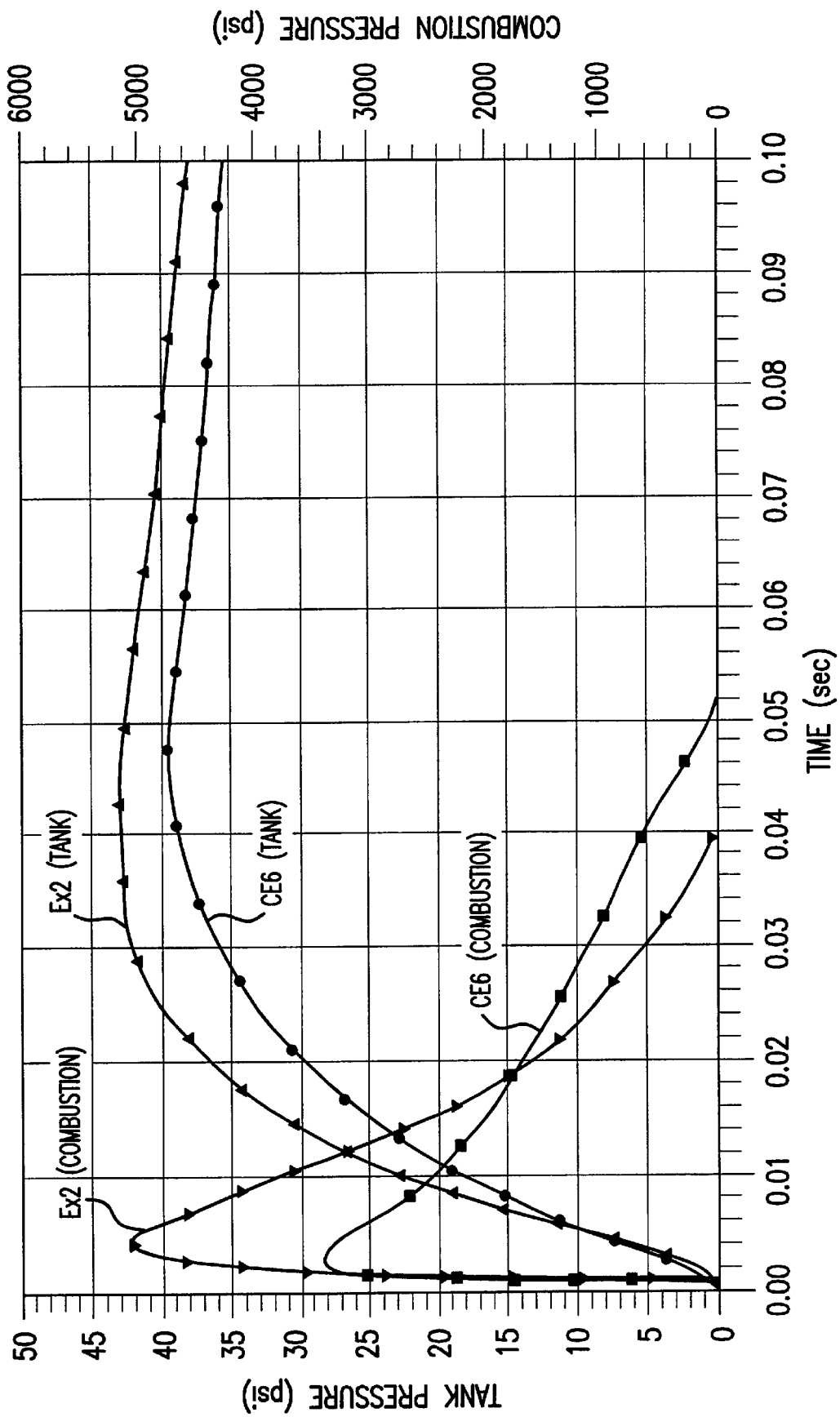
FIG. 8 is a graphical depiction of tank pressure and combustion chamber pressure, respectively, as a function of time performance realized with the test inflator of Comparative Example 6 using a prior art form of gas generant tablet and the test inflator of Example 2 using a body of gas generant material in accordance with one embodiment of the invention.

The combustion chamber pressure vs. time performance and the tank pressure vs. time performance realized upon the firing of the test inflator device in Comparative Example 6 are illustrated in FIG. 8.

Example 2

A plurality of gas generant tablets in accordance with one embodiment of the invention were made using a pyrotechnic gas generant material of the same composition as used in Comparative Example 6. These gas generant tablets were of an equilateral triangular form of the following dimensions:

height=0.187 in
thickness=0.055 in
radius of the circumscribed circle 0.125 in

Then, a 30-gram load of these pyrotechnic gas generant material tablets in accordance with one embodiment of the invention was separately loaded into the heavyweight test inflator device used in Comparative Example 6.

The combustion chamber pressure vs. time performance and the tank pressure vs. time performance realized upon the firing of the test inflator device in Example 2 are also illustrated in FIG. 8.

Discussion of Results

As shown in FIG. 8, Example 2 provided a 38% increase in rise rate and a 23% increase in $P_{20}$. This provides a more aggressive performance as required in particular applications, as described above. Further, the higher peak pressure realized in Example 2 as compared to Comparative Example 6, as shown by the respective combustion pressure

TABLE 3

| | | TABLET | | | | TOTAL SURFACE |
| --- | --- | --- | --- | --- | --- | --- |
| TEST | # SIDES | LENGTH SIDE (in) | AREA (in$^2$) | VOL. (cc) | MASS (g) | # TABLETS | AREA (in$^2$) |
| Ex 1 | 3 | 0.217 | 0.076 | 0.018 | 0.037 | 1421 | 108.5 |
| CE 1 | 4 | 0.177 | 0.101 | 0.028 | 0.056 | 923 | 93.6 |
| CE 2 | 5 | 0.147 | 0.115 | 0.033 | 0.067 | 776 | 89.1 |
| CE 3 | 6 | 0.125 | 0.122 | 0.037 | 0.073 | 710 | 87.0 |
| CE 4 | 8 | 0.096 | 0.130 | 0.040 | 0.080 | 653 | 85.1 |
| CE 5 | cylinder | n/a | 0.1413 | 0.044 | 0.088 | 588 | 83.1 |

Discussion of Results

As shown, tablets whose face was in the shape of an equilateral triangle (Example 1) provided the greatest surface area per unit mass of any of the evaluated regular polygon face tablet forms given the above-identified constraints.

versus time traces, is indicative of the realization of increased performance with identical hardware obtained through the practice of the invention.

Comparative Example 7 and Examples 3 and 4

These tests involved a further comparison of a prior art cylindrical form of gas generant tablet and two specific forms (Examples 3 and 4) of gas generant bodies in accordance with different embodiments of the invention. Details with regard to these forms are provided below:

Comparative Example 7 diameter=0.25 in
thickness=0.060 in
cup-depth=0.003 in

With regard to Examples 3 and 4, see TABLE 3, below. In TABLE 3, the parameter "circle diameter" refers to the diameter of the appropriate circumscribed circle. Further, a side face arc radius value of infinite corresponds to a flat side face and a dome height of 0 corresponds to a flat face.

TABLE 3

| PARAMETER | EXAMPLE 3 | EXAMPLE 4 |
|---|---|---|
| circle diameter (in) | 0.25 | 0.25 |
| radius of corner (in) | 0.02 | 0.02 |
| side face arc radius (in) | infinite | 0.60 |
| dome height (in) | 0 | 0.03 |
| thickness (in) | 0.055 | 0.06 |

In comparing the tablet forms of Comparative Example 7 and Examples 3 and 4, the following parameters were kept constant:

density=1.95 grams per cubic centimeter
load 44.0 grams

The results of this comparison are shown in TABLE 4, below, where tablet area and mass refer to the outer surface area and mass of a respective tablet; "# TABLETS" refers to the total number of tablets required for the specified load; and "TOTAL SURFACE AREA" refers to the total calculated outer surface area provided for by the tablets at the specified load.

Figure 9:
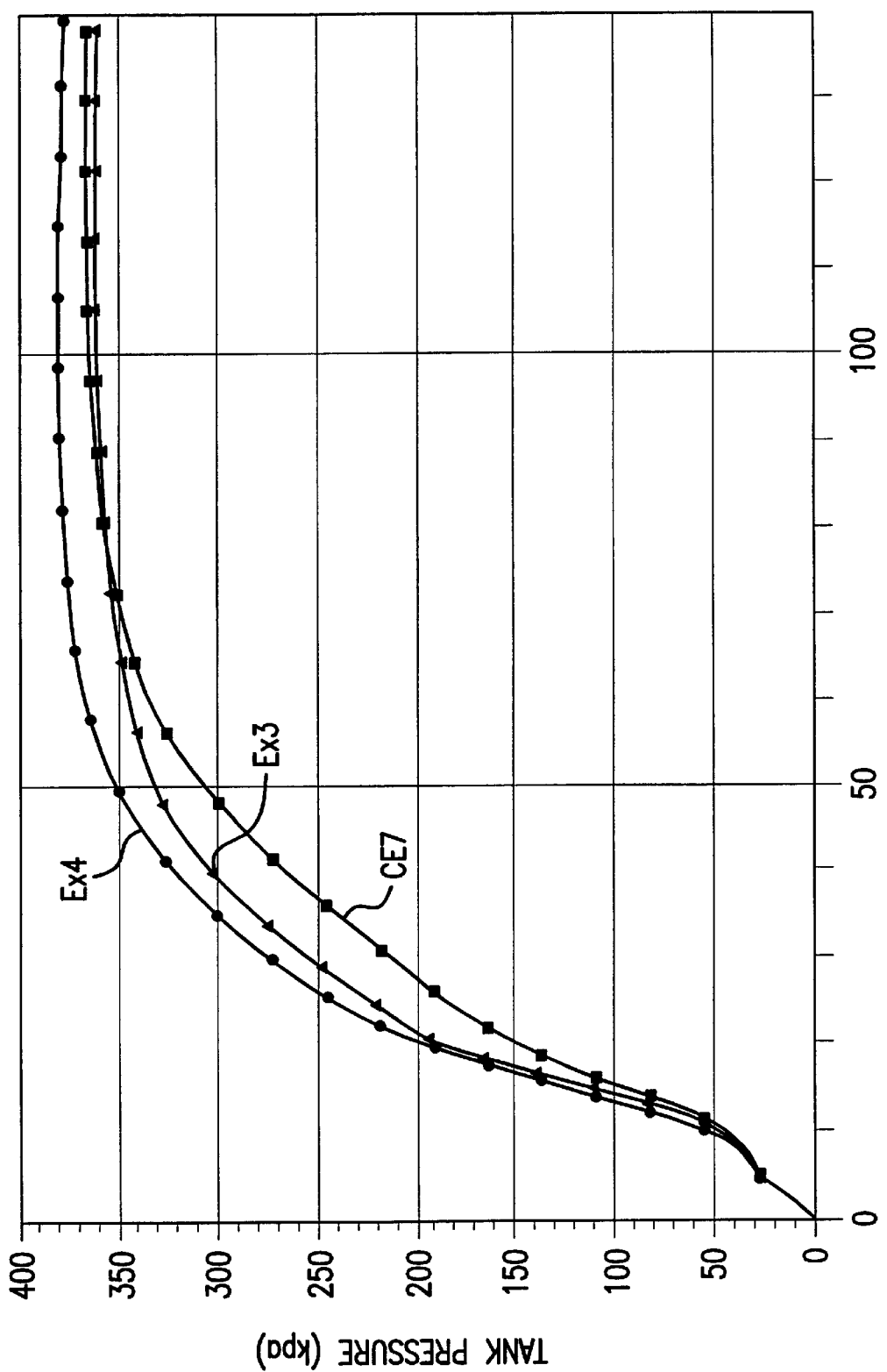
FIG. 9 is a graphical depiction of tank pressure as a function of time performance realized with the test inflator of Comparative Example 7 using a prior art form of gas generant tablet and Examples 3 and 4 using forms of gas generant material in accordance with alternative embodiments of the invention.

The tank pressure vs. time performance realized upon the firing of the test inflator devices in Comparative Example 7 and Examples 3 and 4 are illustrated in FIG. 9.

TABLE 4

| TEST | TABLET AREA (in$^2$) | MASS (g) | # TABLETS | TOTAL SURFACE AREA (in$^2$) |
|---|---|---|---|---|
| CE 7 | 0.14064 | 0.0894 | 492 | 69.22 |
| Ex 3 | 0.08043 | 0.0406 | 1084 | 87.19 |
| Ex 4 | 0.08377 | 0.0455 | 967 | 81.01 |

For each of Comparative Example 7 and Example 3 and 4, the 44.0 gram load of gas generant material was load into a respective test inflator device. In each case, the respective test inflator device was mated to a 100-liter test tank and fired.

Discussion of Results

As shown in FIG. 9, the rise rate obtained with cylindrical tablets of Comparative Example 7 was significantly lower than that obtained with either of the specific forms of gas generant bodies in accordance with different embodiments of the invention (e.g., Examples 3 and 4).

It is further noted, that the rise rate obtained in Example 3 was lower than that obtained in Example 4 even though the total surface area calculated for Example 3 was larger than that for Example 4. The lower rise rate obtained in Example 3 is, in accordance with the invention, believed attributable to at least a portion of the flat face tablets used in Example 3 stacking upon themselves such as to reduce the effective total surface area provided thereby.

While the broader practice of the invention is not necessarily limited to use with gas generant materials having specific burn rate characteristics, practice of the invention in conjunction with gas generant materials having a burn rate of no more than about 0.6 ips (inch per second) at 1000 psi is believed to be of particular interest and benefit. More specifically, through the practice of the invention, gas generant materials normally classified as having low to moderate burn rates (herein defined as a burn rate of about 0.2 ips at 1000 psi to about 0.6 ips at 1000 psi) can desirably find application and use in various aggressive or high performance installations for which such gas generant materials may not normally or otherwise be particularly suited.

Thus, the invention provides a tablet form of gas generant which will yield a higher surface area at a constant gas generant load while satisfying minimum tablet thickness requirements such as necessitated by manufacturing safety issues. In particular, the invention provides a tablet form of gas generant material such will more readily permit the use of low to moderate burn rate gas generant materials in applications having relatively high minimum rise rate requirements.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A body of gas generant material in the form of a tablet having a triangular cross section and with a top face, a bottom face and a side face extending between the top face and the bottom face, wherein at least one of the top and bottom faces is sufficiently curved to prevent stacking along the curved face when the curved face is in contact with an adjacent gas generant material body.

2. The body of gas generant material of claim 1 wherein the side face is composed of three side face segments wherein each of the three side face segments transitions into each of the other of the three side face segments.

3. The body of gas generant material of claim 2 having a circumscribing circle with a radius of at least about 3/16 in to no more than about 5/16 in.

4. The body of gas generant material of claim 2 wherein the side face segments are each of an equal length.

5. The body of gas generant material of claim 2 wherein at least one of the three side face segments is sufficiently arced to prevent stacking along the arced side face segment when the arced side face segment is in contact with an adjacent gas generant material body.

6. The body of gas generant material of claim 5 wherein the arced at least one of the three side face segments has an arc radius of at least 0.2 in to no more than about 0.8 in.

7. The body of gas generant material of claim 5 wherein each of the three side face segments is arced.

8. The body of gas generant material of claim 2 wherein each of the three side face segments transitions with each of the other of the three side face segments via a rounded corner.

9. The body of gas generant material of claim 1 wherein the gas generant material is pressed into the tablet form.

10. The body of gas generant material of claim 1 wherein at least one of the top and bottom faces is cup-shaped with a cup depth of at least 0.003 in to no more than about 0.007 in.

11. The body of gas generant material of claim 1 wherein both the top and bottom faces are cup-shaped.

12. The body of gas generant material of claim 1 wherein the minimum distance between the top and bottom faces is at least 0.05 inches.

13. The body of gas generant material of claim 1 wherein the gas generant material has a burn rate of no more than about 0.6 ips at 1000 psi.

14. A gas generant device containing a plurality of gas generant material bodies of claim 1 in ignition communication with an ignitor for initiating combustion of at least a portion of the plurality of gas generating material bodies.

15. An automotive inflatable restraint system comprising:
the gas generating device of claim 13 connected with a collapsed inflatable airbag cushion to effect inflation thereof.

16. A body of gas generant material of a form having a cup-shaped top face, a cup-shaped bottom face and a side face extending between the top face and the bottom face, with the side face composed of three arced side face segments and wherein each one of the three side face segments is joined with each of the other two of the three side face segments via a rounded corner and wherein the gas generant material has a burn rate of no more than about 0.6 ips at 1000 psi, wherein the cup-shaped top face, the cup-shaped bottom face and the three arced side face segments are each sufficiently curved to prevent stacking along the curved face when the curved face is in contact with an adjacent gas generant material body.

17. The body of gas generant material of claim 16 wherein the three side face segments are each of an equal length.

18. The body of gas generant material of claim 16 wherein a circumscribing circle has a radius of at least about 3/16 in to no more than about 5/16 in.

19. The body of gas generant material of claim 16 wherein each of the arced side face segments has an arc radius of at least 0.2 in to no more than about 0.8 in.

20. The body of gas generant material of claim 16 wherein at least one of the cup-shaped top and bottom faces has a cup depth of at least 0.003 in to no more than about 0.007 in.

21. A method of generating gas comprising igniting a plurality of gas generant material bodies disposed within a combustion chamber, the gas generant material bodies in the form of a tablet having a triangular cross section and with a top face, a bottom face and a side face extending between the top face and the bottom face, wherein at least one of the top and bottom faces is sufficiently curved to prevent stacking along the curved face when the curved face is in contact with an adjacent gas generant material body.

22. The method of claim 21 wherein the side face is composed of three side face segments wherein each of the three side face segments transitions into each of the other of the three side face segments.

23. The method of claim 22 wherein the gas generant material bodies each have a circumscribing circle with a radius of at least about 3/16 in to no more than about 5/16 in.

24. The method of claim 22 wherein the side face segments are each of an equal length.

25. The method of claim 22 wherein at least one of the three side face segments is sufficiently arced to prevent stacking along the arced side face segment when the arced side face segment is in contact with an adjacent gas generant material body.

26. The method of claim 25 wherein the arced at least one of the three side face segments has an arc radius of at least 0.2 in to no more than about 0.8 in.

27. The method of claim 25 wherein each of the three side face segments is arced.

28. The method of claim 22 wherein each of the three side face segments transitions with each of the other of the three side face segments via a rounded corner.

29. The method of claim 21 wherein the gas generant material is pressed into tablet form.

30. The method of claim 29 wherein at least one of the top and bottom faces is cup-shaped with a cup depth of at least 0.003 in to no more than about 0.007 in.

31. The method of claim 30 wherein both the top and bottom faces are cup-shaped.

32. The method of claim 21 wherein the minimum distance between the top and bottom faces is at least 0.05 inches.

33. The method of claim 21 wherein the gas generant material has a burn rate of no more than about 0.6 ips at 1000 psi.

34. The method of claim 22 wherein each of the three side face segments is arced.

* * * * *